United States Patent [19]
Carrie

[11] Patent Number: 5,175,805
[45] Date of Patent: Dec. 29, 1992

[54] METHOD AND APPARATUS FOR SEQUENCING COMPOSITE OPERATIONS OF PIXELS

[75] Inventor: Susan E. Carrie, Mountain View, Calif.

[73] Assignee: Sun Microsystems, Inc., Mountain View, Calif.

[21] Appl. No.: 607,309

[22] Filed: Oct. 30, 1990

[51] Int. Cl.⁵ .............................................. G06F 15/72
[52] U.S. Cl. ................... 395/122; 395/121; 395/131
[58] Field of Search ............... 395/122, 121, 131, 127, 395/129, 120

[56] References Cited

U.S. PATENT DOCUMENTS

| | | | |
|---|---|---|---|
| 4,825,391 | 4/1989 | Merz | 395/131 |
| 4,918,626 | 4/1990 | Watkins et al. | 395/121 |
| 4,992,788 | 3/1991 | Penna et al. | 340/729 |

FOREIGN PATENT DOCUMENTS

2219470 12/1988 United Kingdom .
2226937 5/1989 United Kingdom .

OTHER PUBLICATIONS

Foley, VanDam; "Fundamentals of Interactive Computer Graphics;" Addison-Wesley; 1982; pp. 553–572.

Primary Examiner—Heather R. Herndon
Assistant Examiner—Mike Smith
Attorney, Agent, or Firm—Blakely Sokoloff Taylor & Zafman

[57] ABSTRACT

A pixel buffer separate from the frame buffer is provided to store selected pixel information, including XYZ values, sub-pixel coverage, and a color value for a graphic object. The frame buffer stores pixel information for each pixel on the screen, including sub-pixel coverage. During the rendering process, the pixel information for each graphic object is computed and stored in the frame buffer. However, as subsequent pixel information for the same XY pixel locations are computed, it may be impossible to combine the two separate sets of pixel information into a single set of pixel information while maintaining the pixel information required to combine the single set of pixel information with subsequent pixel information to be rendered to the same XY location. To maintain the pixel information needed, the first set of pixel information is stored in the frame buffer and the second set of pixel information is stored in the pixel buffer. The second set of pixel information stored in the pixel buffer is then subsequently reprocessed. The pixel buffer permits the processing of selected pixel information to be postponed until additional pixel information is available which may simplify the processing of the pixels shared in the pixel buffer. In addition, this pixel information stored in the pixel buffer may be made available to a general purpose processor which can perform selective complex computations.

17 Claims, 6 Drawing Sheets

METHOD AND APPARATUS FOR SEQUENCING COMPOSITE OPERATIONS OF PIXELS

BACKGROUND OF THE INVENTION

1. Field of the Invention

This invention relates to the rendering of graphic images on computer graphic displays more specifically, this invention relates to the rendering of overlapping graphic images on computer graphic displays.

2. Art Background

Although computer graphic displays are two dimensional in nature, it is quite common to display not only one dimensional or two dimensional objects but also three dimensional objects. The third dimension is identified as the depth of the object. Each object or portion of an object are assigned a depth value which indicates how close to the surface of the display that portion of the image is. This depth value, also referred to as the "z" value, is also used to determine what images or portions of images are in front of another when those images overlap in the two dimensional space. For example, if a first polygon has a "z" value of one and a second polygon which is located at the same X,Y coordinates as the first polygon has a "z" value of three, the first polygon will be in front of the second polygon whereby the second polygon is hidden or obscured by the first polygon. Many techniques, particularly time consuming composition equations, have been developed to address the situation of hidden edges and surfaces. See for example Foley, Van Dam, *Fundamentals of Interactive Computer Graphics* (Addison-Wesley 1984), pages 553 to 572.

The determination of hidden surfaces or edges becomes complex and computationally time intensive when several polygons contribute to the appearance of a single pixel in the final rendering. This introduces classical aliasing problems because the pixel typically represents a single point sample. For example, suppose a blue polygon covers one half of the pixel and a yellow polygon covers the other half. The final pixel should appear green as the blue and yellow contributions to that pixel are blended. Computing the contributions to a pixel becomes very complex when different polygons have different Z values for that pixel. Also, multiple polygons can cover arbitrary portions of a pixel. To compute the final appearance of the pixel all of the sub-pixel coverage and color information for each polygon must be available. For example, suppose there are 16 sub-pixel sample: (0,1,2, . . . 15). One polygon may have a Z value of 5 and cover sub-pixel samples (0,1,2,3,4,5). A second polygon may have a Z value of 8 and cover sub-pixel samples (4,5,6,7,8,9). Furthermore, either polygon may be rendered into the frame buffer first. To produce the correct result, the coverage, Z and color information of the first polygon must be saved until the second is rendered into the frame buffer. This problem extends to as many polygons as there are combinations of Z and coverage values.

In one technique, only one sub-pixel sample is processed at a time and the entire scene is constructed by processing a display list once for each sub-pixel sample. In this way the information is stored in the display list, minimizing storage requirements, but increasing computational requirements. In addition, the scene must be stored in a manner which will allows repetitive processing of the scene. In another method each sub-pixel sample is stored in the frame buffer. However, this greatly increases the memory required for the frame buffer. Furthermore, while the display list need only be processed once, a separate computation is required for each sub-pixel sample.

SUMMARY OF THE INVENTION

It is therefore an object of the present invention to provide a technique for the rendering of graphic objects on a computer display device which is efficient in its use of memory, reduces computational complexity, and does not require multiple processing of the scene.

A pixel buffer separate from the frame buffer is provided to store selected pixel information, including XYZ values, sub-pixel coverage, and a color value for a graphic object. The frame buffer stores pixel information for each pixel on the screen, including subpixel coverage. During the rendering process, the pixel information for each graphic object is computed and stored in the frame buffer. However, as subsequent pixel information for the same XY pixel locations are computed, it may be impossible to combine the two separate sets of pixel information into a single set of pixel information while maintaining the pixel information required to combine the single set of pixel information with subsequent pixel information to be rendered to the same XY location. To maintain the pixel information needed, the first set of pixel information is stored in the frame buffer and the second set of pixel information is stored in the pixel buffer. The second set of pixel information stored in the pixel buffer is then subsequently reprocessed. The pixel buffer permits the processing of selected pixel information to be postponed until additional pixel information is available which may simplify the processing of the pixels shared in the pixel buffer. In addition, this pixel information stored in the pixel buffer may be made available to a general purpose processor which can perform selective complex computations.

BRIEF DESCRIPTION OF THE DRAWINGS

The objects, features and advantages of the present invention will be apparent from the following detailed description in which.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

General System Description

Figure 1:
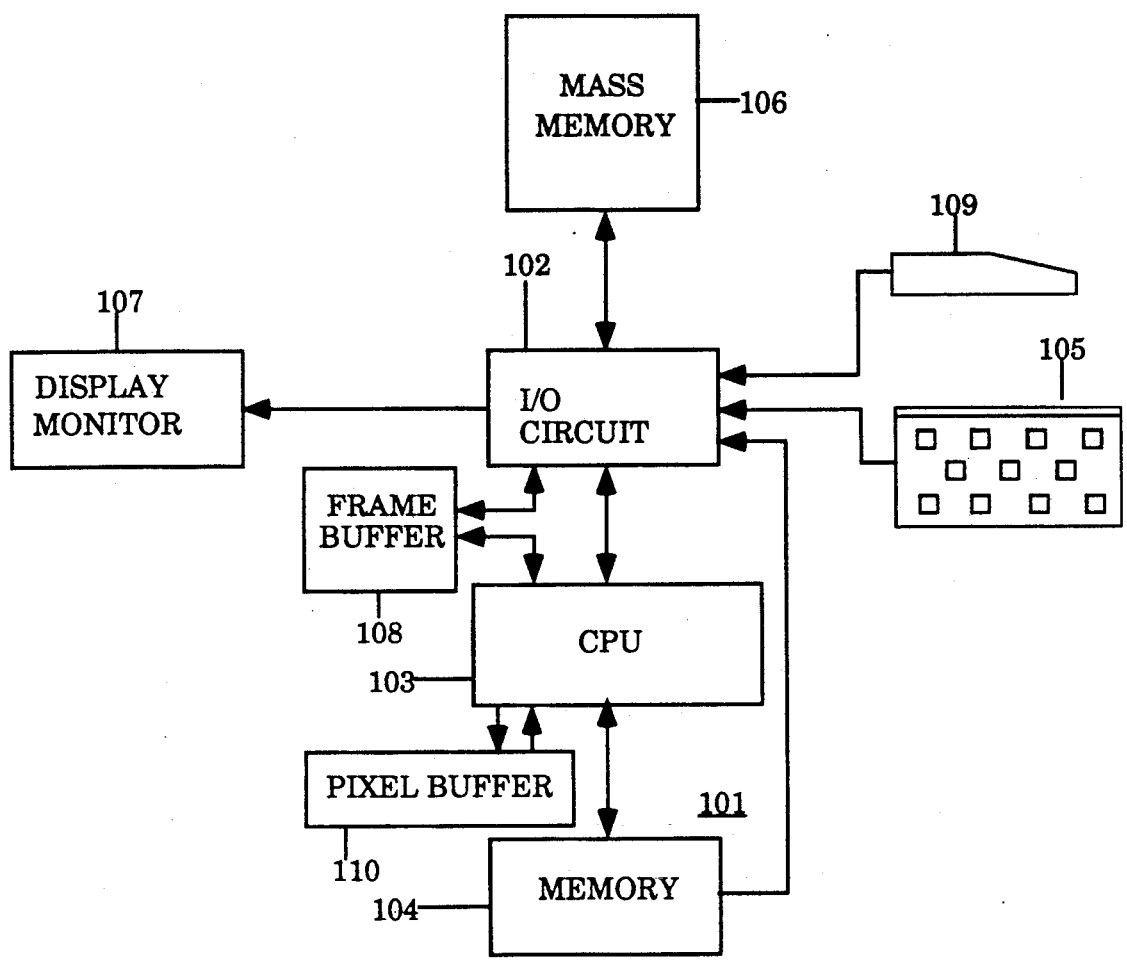
FIG. 1 an example of a typical computer-based system for rendering graphic images according to the present invention.

FIG. 1 shows a typical computer-based system for rendering overlapping graphic images according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having like capabilities may of course be adapted in a straightforward manner to perform the functions described below.

Also shown in FIG. 1 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user as well as graphic images, e.g., images rendered according to the process of the present invention. The display monitor comprises a matrix of display elements, referred to as pixels, which are enabled or "turned on" in a specific pattern at predetermined intensities to provide a graphic image on the display. If the display is a color monitor, for each basic color element, e.g., red, green and blue elements, the pixels are enabled in a specific pattern at a predetermined intensity. The viewer of the displayed image visually combines the red, green, and blue elements at each pixel to perceive a color image. Such a display monitor may take the form of any of several well-known varieties of raster display devices. The graphic image data is provided to the frame buffer 108. The I/O circuit 102 reads the graphic image data from the frame buffer 108 and enables the corresponding pixels on the display monitor 107 at the location and intensity specified by the graphic image data. A cursor control 109 is used to select command modes and edit the input data, and in general provides a more convenient means to input information into the system.

Also included is pixel buffer 110 which is used, according to the system of the present invention, to store the pixel information with respect to those pixels which cannot be immediately resolved due to graphics objects which partially cover the same pixel at different. The pixel buffer 110 may be a separate memory device such as random access memory or a first in first out (FIFO) buffer, a register, a queue located in a predetermined portion of shared memory 104, or the like.

Process Description

The below discussion of the detail description of the invention describes the rendering of polygons on a raster display device. However, it will be obvious to one skilled in the art from reading the following discussion that the process is not limited to polygon rendering and can be applied to the rendering of any type of graphic object. In the scan conversion process of a polygon, the polygon, which is defined by the coordinates of its vertices, is converted to a raster image comprising a plurality of display elements referred to as pixels. The outline or edges of the polygon are first determined and the pixels between the polygon edges are then filled. For more information on the scan conversion process see: Foley and Van Dam, *Fundamentals of Interactive Computer Graphics*, (Addison-Wesley Publishing, 1984) pages 431-476).

The data associated with each pixel typically consists of the x,y coordinate location of the pixel, the depth or "z" value, and data which identifies the color (e.g. rgb) or intensity of the pixel. A subpixel mask may also be used to indicate the locations of coverage within the pixel. For example, a subpixel mask may provide a 16-bit pattern on a 4×4 grid of coverage for a polygon on a pixel. The mask represents coverage of a combination of 16 subpixel areas plus full coverage and no coverage which provides for 16384 different combinations of subpixel masks. For example, the mask may be a 4×4 array composed of bits where a value of zero indicates that the polygon does not cover the subpixel sample point and a value of one indicates that it does. To generate the subpixel mask, the polygon pixels are quantized to subpixel values after passing through any geometric manipulations.

Referring to FIGS. 2a through 2e, the process employed will be herein described. The graphic object, e.g., the polygon, is translated at block 200, to a graphic image comprising pixels. At block 210 each pixel of of the graphic object is compared to the corresponding pixel in the frame buffer image, the frame buffer image representing the background image or scene and those graphic objects rendered prior to the current graphic object to be rendered. Each pixel is analyzed separately and independently in order to generate the resultant graphic image. The pixel information stored in the frame buffer is the z or depth value, the color value and the subpixel mask representing the coverage of the pixel. At block 220, if the "z" value of the pixel from the graphic object (new_z) is equal to the z value of the corresponding pixel from the frame buffer image (fb_z), then the pixel can be combined with the information in the frame buffer at the corresponding pixel of the frame buffer which is determined according to the xy coordinate location of the graphic object pixel.

Figure 2A:
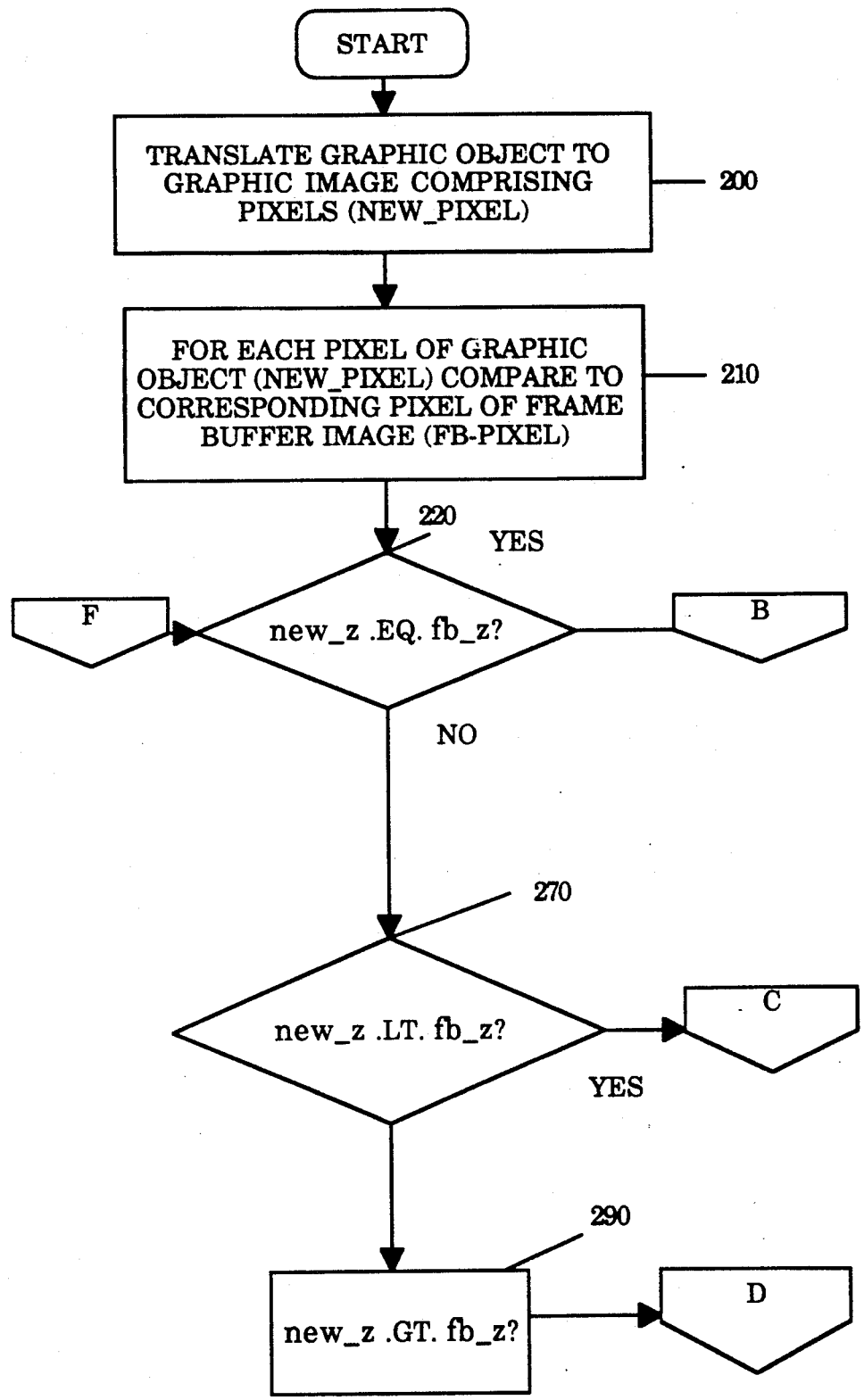
FIGS. 2a-2e are flow charts which illustrate the process of the present invention.
Figure 2B:
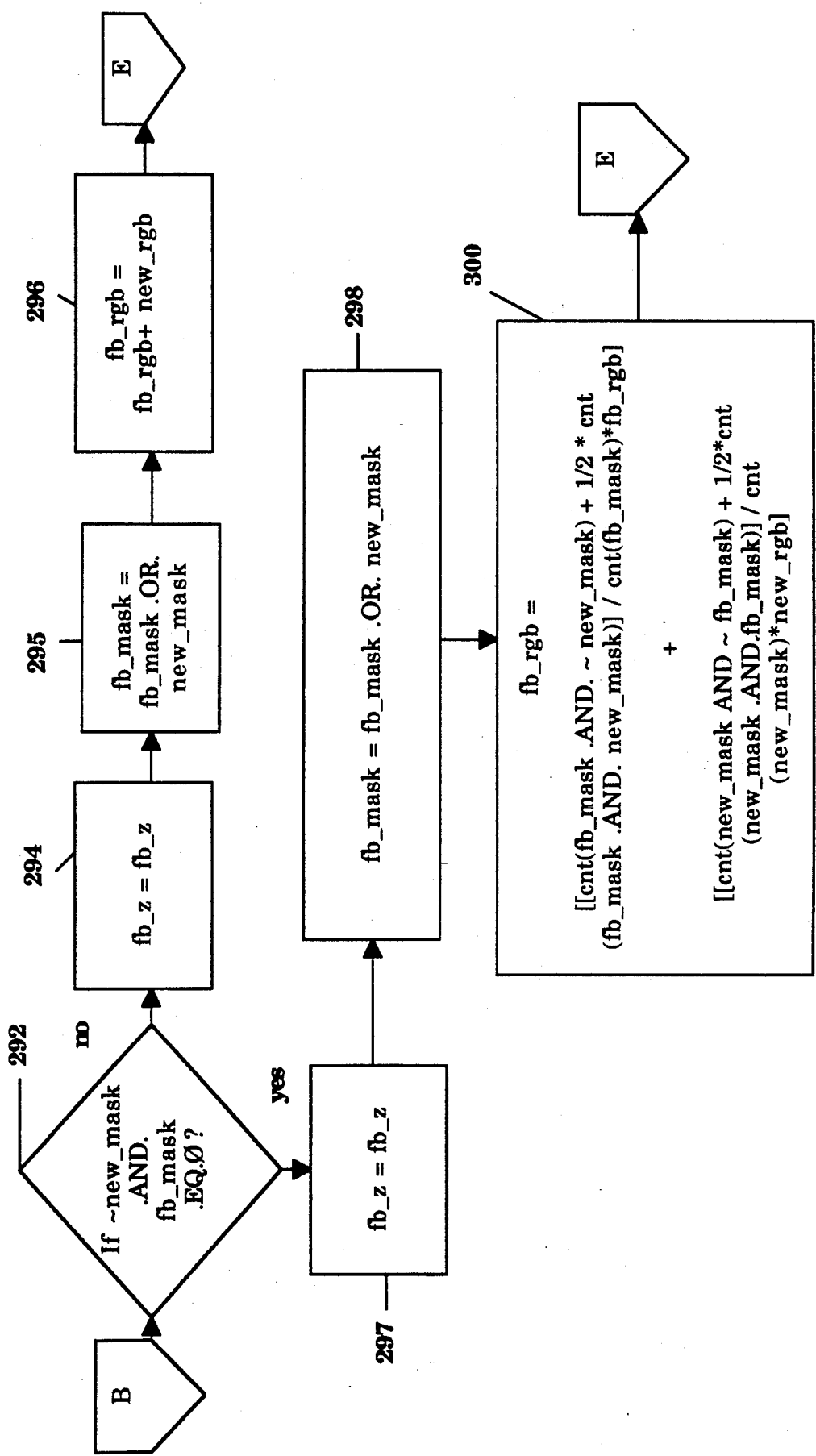

Referring to FIG. 2b, at block 292, if the new_mask (that is the subpixel mask for the graphic object pixel) does not overlap with the subpixel mask of the frame buffer pixel (fb_mask) then, at block 294, the z value of the frame buffer pixel (fb_z) is maintained at the same value and at block 295 the frame buffer subpixel mask (fb_mask) is set to be the logical OR of fb_mask and new_mask. At block 296 the color of the frame buffer pixel fb_rgb is set to equal the sum of the color of the frame buffer pixel (fb_rgb) and the color of the graphic object pixel (new_rgb). If the logical AND function of not (~) new_mask and fb_mask is not equal to zero, the pixels to be blended overlap. At block 297 the frame buffer z value fb_z is maintained to be the same value, at block 298 the sub pixel mask fb_mask is equal to fb_mask logically ORed with new_mask. At block 300 the color of the frame buffer pixel is determined according to the equation set forth in block 300 which determines the color according to the amount of contributions of each pixel, that is, the color contribution of the frame buffer pixel and from the graphic object pixel.

Figure 2C:
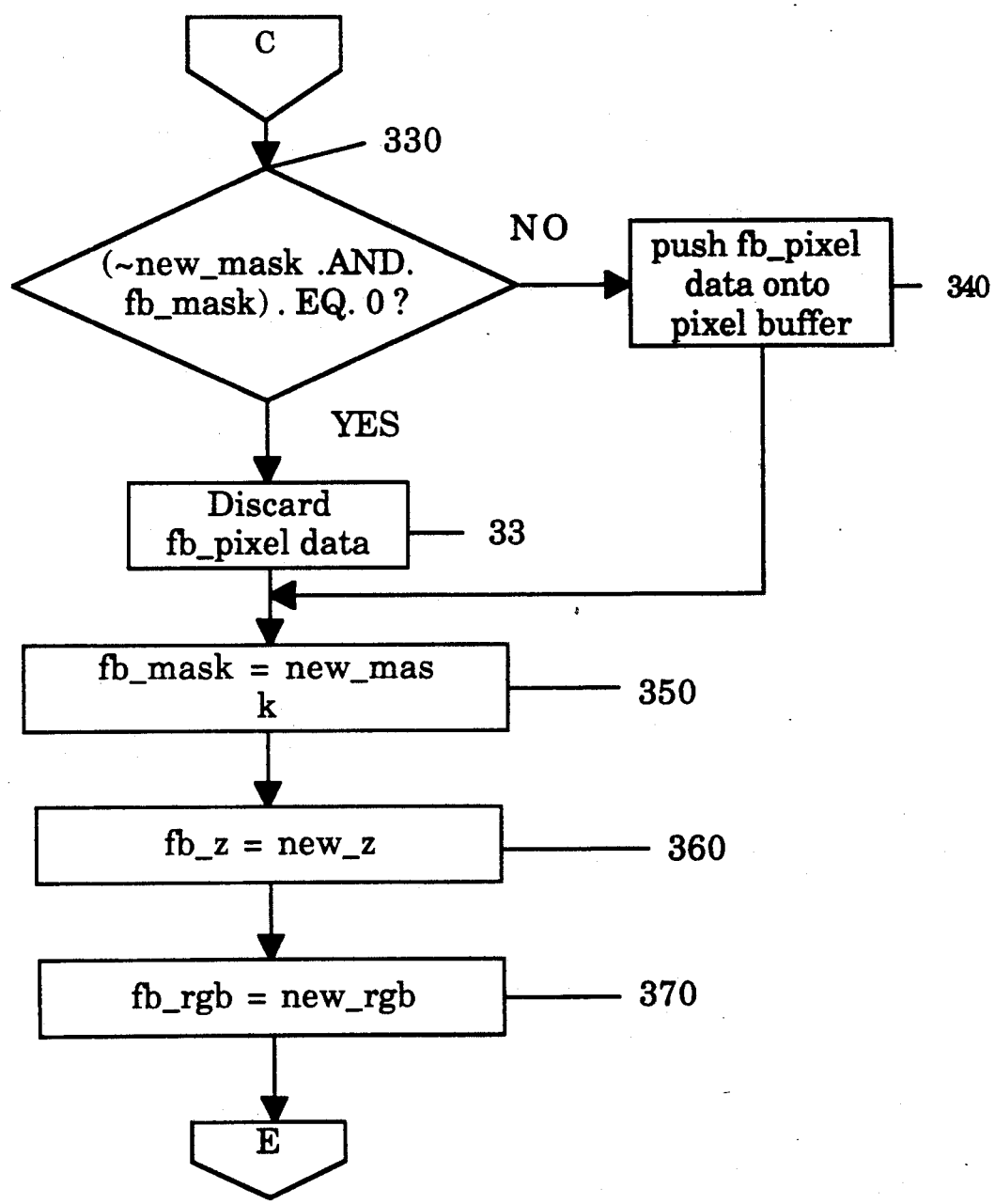
Figure 2D:
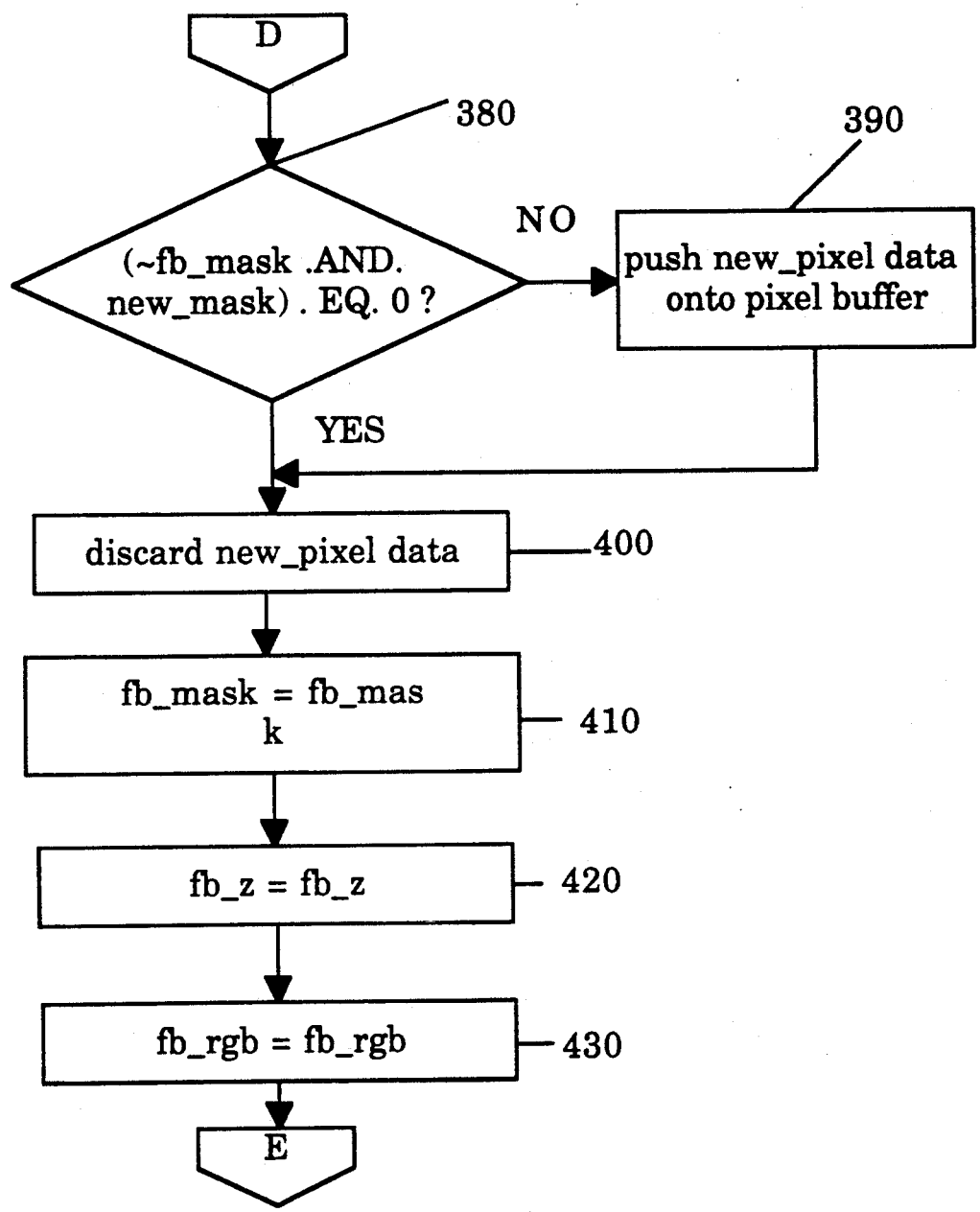

Referring back to FIG. 2a, if at block 270 new_z is less than fb_z, then the graphic object pixel is in front of the corresponding frame buffer pixel and, referring to FIG. 2c, at block 330 it is determined whether the coverage within the pixel overlap. Thus if the logical AND operation of not new_mask and fb_mask is not equal to zero, the frame buffer pixel data is partially behind the graphic object pixel data and therefore it is desirable to push the frame buffer pixel data onto the pixel buffer for storage (block 340). It should be noted that, although not preferably, in the alternative the frame buffer pixel data is maintained in the frame buffer and the graphic object pixel data is pushed onto the pixel buffer.

If the logical AND function of ~new_mask and fb_mask is equal to zero, then the new pixel from the graphic object pixel data completely covers the corresponding frame buffer pixel. At block 335 the frame buffer pixel data fb_pixel data is discarded because the frame buffer pixel data is now completely covered by the graphic object pixel and at blocks 350, 360 and 370, the frame buffer subpixel mask (fb_mask), z value (fb_z) and color value (fb_rgb) are set to be the values of the graphic object pixel (respectively new_mask, new_z, new_rgb). Similarly, if the graphic object pixel does not completely cover the frame buffer pixel, at block 340 the frame buffer pixel data is pushed onto the pixel buffer, the graphic object pixel data is then placed in the frame buffer as set forth in blocks 350, 360 and 370.

Referring back to FIG. 2a, if the z value of the graphic object pixel is greater than the z value of the corresponding frame buffer pixel the frame buffer pixel is in front of the graphic object pixel. At block 380, FIG. 2d, it is determined whether the frame buffer pixel completely covers the graphic object pixel. Thus if ~fb_mask AND new_mask is not equal to zero, then the frame buffer pixel does not completely cover the graphic object pixel and at block 390 the graphic object pixel data (new_pixel data) is pushed onto the pixel buffer and as illustrated by blocks 410, 420, 430, the frame buffer values are maintained (fb_mask, fb_z, fb_rgb). If the frame buffer pixel completely covers the graphic object pixel, at block 400, the new pixel data is discarded because the frame buffer pixel data completely covers the graphic object pixel and there is no need to retain the graphic object pixel data. At blocks 410, 420, 430, the frame buffer mask (fb_mask), the z value (fb_z) and the color value (fb_rgb) are maintained to be the same as is stored in the frame buffer.

Figure 2E:
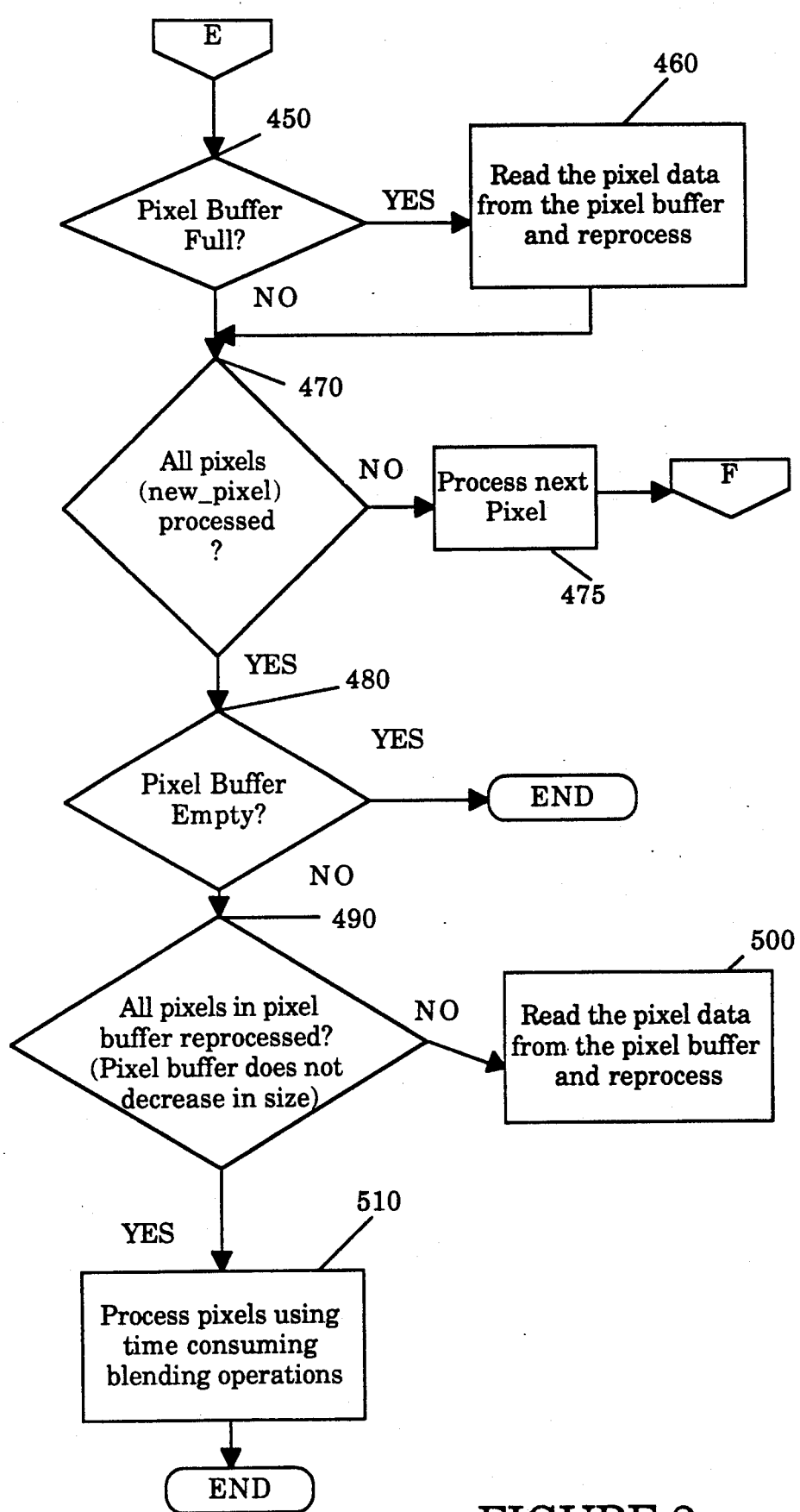

Referring to FIG. 2e, once the processing of the current pixel is completed, the process continues with the next pixel of the graphic object. Before processing the next pixel, the pixel buffer is checked, at block 450, to determine if the pixel buffer is full. If the pixel buffer is full, at block 460, the pixel data stored in the buffer is read from the buffer one pixel at a time and the pixel rendering process, represented by blocks 220 through 290, is repeated. Upon reprocessing many of the pixels in the pixel buffer will be discarded because they were completely occluded by a subsequently rendered graphic object. If the pixel buffer remains full after reprocessing, the system may store all or a portion of the data in the pixel buffer in alternative memory in order to clear at least a portion of the pixel buffer in order to continue processing. The data in the alternative memory is subsequently written back into the pixel buffer or read directly from the alternative memory for subsequent reprocessing.

If additional pixels are to be processed (block 470), the next pixel of the graphic object is processed (block 475). Once all graphic objects have been rendered the final reprocessing of the pixel buffer occurs. During this reprocessing the pixel buffer may empty, or there may be pixels which require more complex calculations in order to be renderend into the image. The pixel data in the pixel buffer will be reprocessed, block 500, until the size of the pixel data in the pixel buffer no longer decreases. If the number of sets of pixel information in the buffer ceases to decrease during reprocessing, block 490, the pixel buffer will not empty. If the pixel buffer cannot be emptied by the performing the processing described above, those pixels remaining in the queue are processed utilizing time consuming blending computations. There are many well known algorithms (such as complex compositing equations) which may be used to perform this blending.

By deferring the time intensive blending computations, most blending computations are avoided or eliminated because a subsequent graphic object rendered is located completely in front of the portion of a previously rendered graphic object represented by a set of pixel information stored in the pixel buffer, thereby eliminating any need to perform the time intensive computation. Thus, those time intensive blending computations are performed only for those pixels which for which there are multiple sets of pixel information which cannot be computed by reprocessing the pixel buffer using the calculations described above.

Another embodiment of the system of the present invention takes into account a special graphic case where multiple polygons have a common edge. When multiple polygons have a common edge it is desirable that the common edge of both polygons have the same z value even though the polygons themselves may be rendered at different z values. In this embodiment, the z values for the vector representing the common edge is computed. The pixels composing the common edge for each of the polygons assume the z values determined for the representative vector and processing continues as set forth in FIGS. 2a-2e where the z values are equal. When the polygons are back facing polygons, a value of one is added to the common z value to insure that the back facing polygon is occluded at a silhouette edge.

While the invention has been described in conjunction with the preferred embodiment it is evident that numerous alternatives, modifications, variations and uses would be apparent to those skilled in an art in the art in light of the foregoing description. In particular, the blending equations described above are only illustrative of the type of computations that may be employed. Other simple blending equations that may be rapidly determined can be utilized and still be within the scope of the present invention. Furthermore, the tests performed to determine whether to temporarily store pixel information in the pixel buffer is only illustrative and can be modified to conform to a particular system or graphic rendering process. For example, the equation set forth in block 310, FIG. 2b may be considered to be too computational intensive to be performed during the initial rendering process (as it is done in the process illustrated by FIG. 2b) and the computation may be deferred until the initial rendering process is completed by pushing the graphic object pixel data (new_pixel data) onto the pixel buffer. After the pixels in the pixel buffer have been reprocessed (block 490, FIG. 2e), this equation can be executed to blend the corresponding pixels.

I claim:

1. An apparatus for generating graphic images from graphic objects for display on a graphics display device, said graphics display device comprising a matrix of pixels, said apparatus comprising a central processing unit (CPU), memory, a frame buffer connected to the CPU and the display device, said graphic image being displayed on the display device according to the pixel data stored in the frame buffer, each pixel data comprising an (x, y, z) coordinate pixel location on the display device, the color of the pixel and a subpixel mask which identifies the extent of coverage across the pixel, said z coordinate identifying the depth of the pixel, said apparatus further comprising:

input means connected to the CPU for receiving data defining the graphic object;

translating means connected to the input means for translating the graphic object data to graphic image pixel data which defines the image of the graphic object;

retrieval means connected to the frame buffer for retrieving the corresponding frame buffer pixel data stored in the frame buffer, said corresponding frame buffer pixel data identifying a pixel located at the same (x, y) coordinate pixel locations as the graphic image pixel data to be rendered;

a pixel buffer;

comparison means comprising a first and second input respectively connected to the translating means, the pixel buffer and the retrieval means for receiving graphic image pixel data and the corresponding frame buffer pixel data, and a first and second output respectively connected to the frame buffer and the pixel buffer, said comparison means comparing the z value of the graphic image pixel data and the corresponding frame buffer pixel data and the subpixel mask of the graphic image pixel data and the subpixel mask of the corresponding frame buffer pixel data, said comparison means comprising;

if the z value of the graphic image pixel data is equal to the z value of the corresponding frame buffer pixel data, if the logical AND of the subpixel mask of the corresponding frame buffer pixel data and the subpixel mask of the graphic image pixel data is equal to zero, a first blending means for blending the graphic image pixel data and the corresponding frame buffer pixel data for output to the frame buffer, and if the logical AND of the subpixel mask of the corresponding frame buffer pixel data and the subpixel mask of the graphic image pixel data is not equal to zero, a second blending means for blending the graphic image pixel data and the corresponding frame buffer pixel data for output to the frame buffer;

if the z value of the graphic image pixel data is less than the z value of the corresponding frame buffer pixel data, if the subpixel mask of the graphic image pixel data occludes the subpixel mask of the frame buffer pixel data, means for discarding the frame buffer pixel data and means for outputting the graphic image pixel data to the frame buffer, and if the subpixel mask of the graphic image pixel data is not occluded by the subpixel mask of the frame buffer pixel data, means for pushing the frame buffer pixel data into the pixel buffer and means for outputting the graphic image pixel data to the frame buffer;

if the z value of the graphic image pixel data is greater than the z value of the corresponding frame buffer pixel data, if the subpixel mask of the frame buffer pixel data, occludes the subpixel mask of the graphic image pixel data, means for discarding the graphic image pixel data, and if the subpixel mask of the frame buffer pixel data does not occlude the subpixel mask of the graphic image pixel data, means for pushing the graphic image pixel data into the pixel buffer;

when all graphic image pixel data has been compared to corresponding frame buffer pixel data, means for reading the pixel buffer data from the pixel buffer for input to the comparison means wherein if the subpixel mask of pixel buffer data is not occluded by the subpixel mask of the frame buffer pixel data, or if the subpixel mask of the frame buffer pixel data is not occluded by the subpixel mask of the pixel buffer data, a third blending means to blend the frame buffer pixel data and the pixel buffer data;

display control means connected to the frame buffer and the graphic display to read the modified pixel data stored in the frame buffer and enable the corresponding pixels on the display at the color specified by the modified pixel data to generate the graphic image on the display;

whereby only those graphic image pixel data which remain in the pixel buffer are combined with the frame buffer pixel data using time consuming compositing equations and the time consuming task of compositing of those graphic image pixels which are behind and occluded by frame buffer pixels is avoided.

2. The apparatus for generating graphic images as set forth in claim 1, wherein said first blending means blends the graphic image pixel data and corresponding frame buffer pixel data according to the following equations:

$$fb\_mask = fb\_mask.OR.new\_mask$$

$$fb\_rgb = fb\_rgb + new\_rgb$$

where fb_mask represents the subpixel mask of the frame buffer pixel data, new_mask represents the subpixel mask of the graphic image pixel data, fb_rgb and new_rgb respectively respresent the color of the frame buffer pixel data and graphic image pixel data, + represents a summing operation and OR represents a logical OR operation.

3. The apparatus for generating graphic images as set forth in claim 1, wherein said second blending means blends the graphic image pixel data and corresponding frame buffer pixel data according to the following equations:

$$fb\_mask = fb\_mask .OR. new\_mask$$

$$fb\_rgb = [[cnt(fb\_mask .AND. \sim new\_mask) + 1/2 * cnt(fb\_mask .AND. new\_mask)]/cnt(fb\_mask)*fb\_rgb]$$
$$+$$
$$[[cnt(new\_mask AND \sim fb\_mask) + 1/2 * cnt(new\_mask .AND. fb\_mask)]/cnt(new\_mask)*new\_rgb]$$

where fb_mask represents the subpixel mask of the frame buffer pixel data, new_mask represents the subpixel mask of the graphic image pixel data, fb_rgb and new_rgb respectively represent the color of the frame buffer pixel data and graphic image pixel data, cnt is a function which counts the number of sub-pixels set in a subpixel mask and OR represents a logical OR operation.

4. The apparatus for generating graphic images as set forth in claim 1 wherein said pixel buffer is a FIFO buffer.

5. The apparatus for generating graphic images as set forth in claim 1 wherein said pixel buffer is located in a random access memory.

6. An apparatus for generating graphic images from graphic objects for display on a graphics display device, said graphics display device comprising a matrix of pixels, said apparatus comprising a central processing unit (CPU), memory, a frame buffer connected to the CPU and the display device, said graphic image being displayed on the display device according to the pixel data stored in the frame buffer, each pixel data comprising an (x, y, z) coordinate pixel location on the display device, the color of the pixel and a subpixel mask which identifies the extent of coverage across the pixel, said z coordinate identifying the depth of the pixel, said apparatus further comprising:

input means connected to the CPU for receiving data defining the graphic object;

translating means connected to the input means for translating the graphic object data to graphic image pixel data which defines the image of the graphic object;

retrieval means connected to the frame buffer for retrieving the corresponding frame buffer pixel data stored in the frame buffer, said corresponding frame buffer pixel data identifying a pixel located at the same (x, y) coordinate pixel locations as the graphic image pixel data to be rendered;

a pixel buffer;

comparison means comprising a first and second input respectively connected to the translating means, the pixel buffer and the retrieval means for receiving graphic image pixel data and the corresponding frame buffer pixel data, and a first and second output respectively connected to the frame buffer and the pixel buffer, said comparison means comparing the z value of the graphic image pixel data and the corresponding frame buffer pixel data and the subpixel mask of the graphic image pixel data and the subpixel mask of the corresponding frame buffer pixel data, said comparison means comprising;

if the z value of the graphic image pixel data is equal to the z value of the corresponding frame buffer pixel data, if the logical AND of the subpixel mask of the corresponding frame buffer pixel data and the subpixel mask of the graphic image pixel data is equal to zero, a first blending means for blending the graphic image pixel data and the corresponding frame buffer pixel data, for output to the frame buffer according to the following equations;

$$fb\_mask = fb\_mask.OR.new\_mask$$

$$fb\_rgb = fb\_rgb + new\_rgb$$

where fb_mask represents the subpixel mask of the frame buffer pixel data, new_mask represents the subpixel mask of the graphic image pixel data, fb_rgb and new_rgb respectively respresent the color of the frame buffer pixel data and graphic image pixel data, + represents an addition operation and OR represents a logical OR operation, if the logical AND of the subpixel mask fo the corresponding frame buffer pixel data and the subpixel mask of the graphic image pixel data is not equal to zero, a second blending means for blending the graphic image pixel data and the corresponding frame buffer pixel data for output to the frame buffer according to the following equations:

$$fb\_mask = fb\_mask \text{ .OR. } new\_mask$$

$$fb\_rgb = [[[cnt(fb\_mask \text{ .AND. } \sim new\_mask) + 1/2*cnt(fb\_mask \text{ .AND. } new\_mask)]/cnt(fb\_mask)*fb\_rgb]$$
$$+$$
$$[[cnt(new\_mask \text{ AND } \sim fb\_mask) + 1/2*cnt(new\_mask \text{ .AND. } fb\_mask)]/cnt(new\_mask)*new\_rgb]$$

where cnt is a function which counts the number of sub-pixels set in a subpixel mask;

if the z value of the graphic image pixel data is less than the z value of the corresponding frame buffer pixel data, if the subpixel mask of the graphic image pixel data occludes the subpixel mask of the frame buffer pixel data, means for discarding the frame buffer pixel data and means for outputting the graphic image pixel data to the frame buffer;

if the sub pixel mask of the graphic image pixel data is not occluded by the sub pixel mask of the frame buffer pixel data, means for pushing the frame buffer pixel data into a pixel buffer and means for outputting the graphic image pixel data to the frame buffer;

if the z value of the graphic image pixel data is greater than the z value of the corresponding frame buffer pixel data, if the subpixel mask of the frame buffer pixel data, occludes the subpixel mask of the graphic image pixel data, means for discarding the graphic image pixel data, and if the subpixel mask of the frame buffer pixel data does not occlude the subpixel mask of the graphic image pixel data, means for pushing the graphic image pixel data into the pixel buffer;

when all graphic image pixel data has been compared to corresponding frame buffer pixel data, means for reading the pixel buffer data from the pixel buffer for input to the comparison means wherein if the subpixel mask of pixel buffer data is not occluded by the subpixel mask of the frame buffer pixel data, or if the subpixel mask of the frame buffer pixel data is not occluded by the subpixel mask of the pixel buffer data, a third blending means to blend the frame buffer pixel data and the pixel buffer data according to compositing equations;

display control means connected to the frame buffer and the graphic display to read the modified pixel data stored in the frame buffer and enable the corresponding pixels on the display at the color specified by the modified pixel data to generate the graphic image on the display;

whereby only those graphic image pixel data which remain in the pixel buffer are combined with the frame buffer pixel data using time consuming compositing equations and the time consuming task of compositing of those graphic image pixels which are behind and occluded by frame buffer pixels is avoided.

7. An apparatus for generating graphic images from graphic objects for display on a graphics display device, said graphics display device comprising a matrix of pixels, said apparatus comprising a central processing unit (CPU), memory, a frame buffer connected to the CPU and the display device, said graphic image being displayed on the display device according to the pixel data stored in the frame buffer, each pixel data comprising an (x, y, z) coordinate pixel location on the display device, the color of the pixel and a subpixel mask which identifies the extent of coverage across the pixel, said z coordinate identifying the depth of the pixel, said apparatus further comprising:

input means connected to the CPU for receiving data defining the graphic object;

translating means connected to the input means for translating the graphic object data to graphic image pixel data which defines the image of the graphic object;

retrieval means connected to the frame buffer for retrieving the corresponding frame buffer pixel data stored in the frame buffer, said corresponding frame buffer pixel data identifying a pixel located at the same (x, y) coordinate pixel locations as the graphic image pixel data to be rendered;

a pixel buffer;

comparison means comprising a first and second input respectively connected to the translating means, the pixel buffer and the retrieval means for receiving graphic image pixel data and the corresponding frame buffer pixel data, and a first and second output respectively connected to the frame buffer and the pixel buffer, said comparison means comparing the z value of the graphic image pixel data and the corresponding frame buffer pixel data and the subpixel mask of the graphic image pixel data and the subpixel mask of the corresponding frame buffer pixel data, said comparison means comprising;

if the z value of the graphic image pixel data is equal to the z value of the corresponding frame buffer pixel data, if the logical AND of the subpixel mask of the corresponding frame buffer pixel data and the subpixel mask of the graphic image pixel data is equal to zero, a first blending means for blending the graphic image pixel data and the corresponding frame buffer pixel data for output to the frame buffer, and if the logical AND of the subpixel mask of the correspoding frame buffer pixel data and the subpixel mask of the graphic image pixel data is not equal to zero, means for pushing the
graphic image pixel data into the pixel buffer;
if the z value of the graphic image pixel data is
less than the z value of the corresponding
frame buffer pixel data,
if the subpixel mask of the graphic image pixel data
occludes the subpixel mask of the frame buffer
pixel data, means for discarding the frame buffer
pixel data and means for outputting the graphic
image pixel data to the frame buffer, and
if the subpixel mask of the graphic image pixel
data is not occluded by the subpixel mask of
the frame buffer pixel data, means for pushing
the frame buffer pixel data into the pixel buffer
and means for outputting the graphic image
pixel data to the frame buffer;
if the z value of the graphic image pixel data is
greater than the z value of the corresponding
frame buffer pixel data,
if the subpixel mask of the frame buffer pixel
data, occludes the subpixel mask of the
graphic image pixel data, means for discarding
the graphic image pixel data, and
if the subpixel mask of the frame buffer pixel data
does not occlude the subpixel mask of the
graphic image pixel data, means for pushing
the graphic image pixel data into the pixel
buffer;
when all graphic image pixel data has been compared
to corresponding frame buffer pixel data, means for
reading the pixel buffer data from the pixel buffer
for input to the comparison means wherein if the
subpixel mask of pixel buffer data is not occluded
by the subpixel mask of the frame buffer pixel data,
or if the subpixel mask of the frame buffer pixel
data is not occluded by the subpixel mask of the
pixel buffer data, a third blending means to blend
the frame buffer pixel data and the pixel buffer
data;
display control means connected to the frame buffer
and the graphic display to read the modified pixel
data stored in the frame buffer and enable the corresponding pixels on the display at the color specified by the modified pixel data to generate the
graphic image on the display;
whereby only those graphic image pixel data which
remain in the pixel buffer are combined with the
frame buffer pixel data using time consuming compositing equations and the time consuming task of
compositing of those graphic image pixels which
are behind and occluded by frame buffer pixels is
avoided.

8. The apparatus for generating graphic images as set
forth in claim 7, wherein said first blending means
blends the graphic image pixel data and corresponding
frame buffer pixel data according to the following equations:

$$fb\_mask = fb\_mask.OR.new\_mask$$

$$fb\_rgb = fb\_{rgb} + new\_rgb$$

where fb_mask represents the subpixel mask of the
frame buffer pixel data, new_mask represents the
subpixel mask of the graphic image pixel data,
fb_rgb and new_rgb respectively represent the
color of the frame buffer pixel data and graphic
image pixel data, + represents an addition operation and OR represents a logical OR operation.

9. The apparatus for generating graphic images as set
forth in claim 7 wherein said pixel buffer is a FIFO
buffer.

10. The apparatus for generating graphic images as
set forth in claim 7 wherein said pixel buffer is located
in a random access memory.

11. In an apparatus for generating graphic images
from graphic objects for display on a graphics display
device, said graphics display device comprising a matrix of pixels, said apparatus comprising a central processing unit (CPU), memory, a frame buffer connected
to the CPU and the display device, said graphic image
being displayed on the display device according to the
pixel data stored in the frame buffer, each pixel data
comprising an (x, y, z) coordinate pixel location on the
display device, the color of the pixel and a subpixel
mask which identifies the extent of coverage across the
pixel, said z coordinate identifying the depth of the
pixel, a method for rendering graphic images whereby
the need to employ time consuming blending operations
is minimized, comprising the steps of:
providing a pixel buffer;
receiving data defining the graphic object;
translating the graphic object data received to
graphic image pixel data which defines the image
of the graphic object;
retrieving the corresponding frame buffer pixel data
stored in the frame buffer, said corresponding
frame buffer pixel data identifying a pixel located at
the same (x, y) coordinate pixel locations as the
graphic image pixel data to be rendered;
comparing the z value of the graphic image pixel data
and the corresponding frame buffer pixel data and
the subpixel mask of the graphic image pixel data
and the subpixel mask of the corresponding frame
buffer pixel data, comprising the steps of;
if the z value of the graphic image pixel data is
equal to the z value of the corresponding frame
buffer pixel data,
if the logical AND of the subpixel mask of the
corresponding frame buffer pixel data and the
subpixel mask of the graphic image pixel data
is equal to zero, blending, according to a first
blending function, the graphic image pixel
data corresponding frame buffer pixel data and
outputting the data to the frame buffer, and
if the logical AND of the subpixel mask of the
corresponding frame buffer pixel data and the
subpixel mask of the graphic image pixel data
is not equal to zero, blending, according to a
second blending function, the graphic image
pixel data and the corresponding frame buffer
pixel data and outputting the data to the frame
buffer;
if the z value of the graphic image pixel data is less
than the z value of the corresponding frame
buffer pixel data,
if the subpixel mask of the graphic image pixel
data occludes the subpixel mask of the frame
buffer pixel data, discarding the frame buffer
pixel data and outputting the graphic image
pixel data to the frame buffer, and
if the subpixel mask of the graphic image pixel
data is not occluded by the subpixel mask of
the frame buffer pixel data, pushing the frame
buffer pixel data into the pixel buffer and outputting the graphic image pixel data to the frame buffer;

if the z value of the graphic image pixel data is greater than the z value of the corresponding frame buffer pixel data, if the subpixel mask of the frame buffer pixel data occludes the subpixel mask of the graph image pixel data, discarding the graphic image pixel data, and if the subpixel mask of the frame buffer pixel data does not occlude the subpixel mask of the graphic image pixel data, pushing the graphic image pixel data;

when all graphic image pixel data has been compared to corresponding frame buffer pixel data or when the pixel buffer is full, reading the pixel buffer data from the pixel buffer and comparing the pixel buffer data to the corresponding frame buffer pixel data wherein if the subpixel mask of pixel buffer data is not occluded by the subpixel mask of the frame buffer pixel data, or if the subpixel mask of the frame buffer pixel data is not occluded by the subpixel mask of the pixel buffer data, blending according to a third blending function the frame buffer pixel data and pixel buffer data;

reading the modified pixel data stored in the frame buffer and enabling the corresponding pixels on the display at the color specified by the modified pixel data to generate the graphic image on the display;

whereby only those graphic image pixel data which remain in the pixel buffer are combined with the frame buffer pixel data using time consuming compositing equations and the time consuming task of compositing of those graphic image pixels which are behind and occluded by frame buffer pixels is avoided.

12. The method for generating graphic images as set forth in claim 11, wherein said first blending function comprises:

$$fb\_mask = fb\_mask.OR.new\_mask$$

$$fb\_rgb = fb\_rgb + new\_rgb$$

where fb_mask represents the subpixel mask of the frame buffer pixel data, new_mask represents the subpixel mask of the graphic image pixel data, fb_rgb and new_rgb respectively represent the color of the frame buffer pixel data and graphic image pixel data, + represents an addition operation and OR represents a logical OR operation.

13. The method for generating graphic images as set forth in claim 11, wherein said second blending function comprises:

$$fb\_mask = fb\_mask .OR. new\_mask$$

$$fb\_rgb = [[cnt(fb\_mask .AND. \sim new\_mask) + 1/2 *$$
$$cnt(fb\_mask .AND. new\_mask)]/cnt(fb\_mask) * fb\_rgb]$$
$$+$$
$$[[cnt(new\_mask AND \sim fb\_mask) + 1/2 *$$
$$cnt(new\_mask .AND. fb\_mask)]/cnt(new\_mask) * new\_rgb]$$

where fb_mask represents the subpixel mask of the frame buffer pixel data, new_mask represents the subpixel mask of the graphic image pixel data, fb_rgb and new_rgb respectively represent the color the frame buffer pixel data and graphic image pixel data, cnt is a function which counts the number of sub-pixels set in a subpixel mask and OR represents a logical OR operation.

14. The method for generating graphic images as set forth in claim 11, wherein said pixel buffer is a FIFO buffer.

15. The method for generating graphic images as set forth in claim 11, wherein said pixel buffer is located in random access memory.

16. In an apparatus for generating graphic images from graphic objects for display on a graphics display device, said graphics display device comprising a matrix of pixels, said apparatus comprising a central processing unit (CPU), memory, a frame buffer connected to the CPU and the display device, said graphic image being displayed on the display device according to the pixel data stored in the frame buffer, each pixel data comprising an (x, y, z) coordinate pixel location on the display device, the color of the pixel and a subpixel mask which identifies the extent of coverage across the pixel, said z coordinate identifying the depth of the pixel, a method for rendering graphic images whereby the need to employ time consuming blending operations is minimized, comprising the steps of:

providing a pixel buffer;

receiving data defining the graphic object;

translating the graphic object data received to graphic image pixel data which defines the image of the graphic object;

retrieving the corresponding frame buffer pixel data stored in the frame buffer, said corresponding frame buffer pixel data identifying a pixel located at the same (x, y) coordinate pixel locations as the graphic image pixel data to be rendered;

comparing the z value of the graphic image pixel data and the corresponding frame buffer pixel data and the subpixel mask of the graphic image pixel data and the subpixel mask of the corresponding frame buffer pixel data, comprising the steps of;

if the z value of the graphic image pixel data is equal to the z value of the corresponding frame buffer pixel data, if the logical AND of the subpixel mask of the corresponding frame buffer pixel data and the subpixel mask of the graphic image pixel data is equal to zero, blending according to a first blending function, the graphic image pixel data corresponding frame buffer pixel data and outputting the data to the frame buffer, said first blending function comprising, $$fb\_mask = fb\_mask.OR.new\_mask$$

$$fb\_rgb = fb\_rgb + new\_rgb$$

where fb_mask represents the subpixel mask of the frame buffer pixel data, new_mask represents the subpixel mask of the graphic image pixel data, fb_rgb and new_rgb respectively represent the color of the frame buffer pixel data and graphic image pixel data and OR represents a logical OR operation, if the logical AND of the subpixel mask of the corresponding frame buffer pixel data dn the subpixel mask of the graphic image pixel data is not equal to zero, blending according to a second blending function the graphic image pixel data and the corresponding frame buffer pixel data and outputting the data to the frame buffer; said second blending equation comprising, $$fb\_mask = fb\_mask .OR. new\_mask$$

$$fb\_rgb = [[cnt(fb\_mask .AND. \sim new\_mask) \div 1/2 * cnt(fb\_mask .AND. new\_mask)]/cnt(fb\_mask)*fb\_rgb]$$
$$\pm$$
$$[[cnt(new\_mask AND \sim fb\_mask) \div 1/2 * cnt(new\_mask .AND. fb\_mask)]/cnt(new\_mask)*new\_rgb]$$

where cnt is a function which counts the number of sub-pixels set in a subpixel mask;

if the z value of the graphic image pixel data is less than the z value of the corresponding frame buffer pixel data,
- if the subpixel mask of the graphic image pixel data occludes the subpixel mask of the frame buffer pixel data, discarding the frame buffer pixel data and outputting the graphic image pixel data to the frame buffer, and
- if the subpixel mask of the graphic image pixel data is not occluded by the subpixel mask of the frame buffer pixel data, pushing the frame buffer pixel data into the pixel buffer and outputting the graphic image pixel data to the frame buffer;

if the z value of the graphic image pixel data is greater than the z value of the corresponding frame buffer pixel data,
- if the subpixel mask of the frame buffer pixel data occludes the subpixel mask of the graph image pixel data, discarding the graphic image pixel data, and
- if the subpixel mask of the frame buffer pixel data does not occlude the subpixel mask of the graphic image pixel data, pushing the graphic image pixel data;

when all graphic image pixel data has been compared to corresponding frame buffer pixel data or when the pixel buffer is full, reading the pixel buffer data from the pixel buffer and comparing the pixel buffer data to the corresponding frame buffer pixel data wherein if the subpixel mask of pixel buffer data is not occluded by the subpixel mask of the frame buffer pixel data, or if the subpixel mask of the frame buffer pixel data is not occluded by the subpixel mask of the pixel buffer data, blending according to a third blending function the frame buffer pixel data and pixel buffer data;

reading the modified pixel data stored in the frame buffer and enabling the corresponding pixels on the display at the color specified by the modified pixel data to generate the graphic image on the display;

whereby only those graphic image pixel data which remain in the pixel buffer are combined with the frame buffer pixel data using time consuming compositing equations and the time consuming task of compositing of those graphic image pixels which are behind and occluded by frame buffer pixels is avoided.

17. In an apparatus for generating graphic images from graphic objects for display on a graphics display device, said graphics display device comprising a matrix of pixels, said apparatus comprising a central processing unit (CPU), memory, a frame buffer connected to the CPU and the display device, said graphic image being displayed on the display device according to the pixel data stored in the frame buffer, each pixel data comprising an (x, y, z) coordinate pixel location on the display device, the color of the pixel and a subpixel mask which identifies the extent of coverage across the pixel, said z coordinate identifying the depth of the pixel, a method for rendering graphic images whereby the need to employ time consuming blending operations is minimized, comprising the steps of:

providing a pixel buffer;

receiving data defining the graphic object;

translating the graphic object data received to graphic image pixel data which defines the image of the graphic object;

retrieving the corresponding frame buffer pixel data stored in the frame buffer, said corresponding frame buffer pixel data identifying a pixel located at the same (x, y) coordinate pixel locations as the graphic image pixel data to be rendered;

comparing the z value of the graphic image pixel data and the corresponding frame buffer pixel data and the subpixel mask of the graphic image pixel data and the subpixel mask of the corresponding frame buffer pixel data, comprising the steps of;
- if the z value of the graphic image pixel data is equal to the z value of the corresponding frame buffer pixel data,
  - if the logical AND of the subpixel mask of the corresponding frame buffer pixel data and the subpixel mask of the graphic image pixel data is not equal to zero, pushing the graphic image pixel data into the pixel buffer, and
  - if the logical AND of the subpixel mask of the corresponding frame buffer pixel data and the subpixel mask of the graphic image pixel data is not equal to zero, blending according to a second blending function the graphic image pixel data and the corresponding frame buffer pixel data and outputting the data to the frame buffer;
- if the z value of the graphic image pixel data is less than the z value of the corresponding frame buffer pixel data, if the subpixel mask of the graphic image pixel data occludes the subpixel mask of the frame buffer pixel data, discarding the frame buffer pixel data and outputting the graphic image pixel data to the frame buffer, and if the subpixel mask of the graphic image pixel data is not occluded by the subpixel mask of the frame buffer pixel data, pushing the frame buffer pixel data into the pixel buffer and outputting the graphic image pixel data to the frame buffer;

if the z value of the graphic image pixel data is greater than the z value of the corresponding frame buffer pixel data, if the subpixel mask of the frame buffer pixel data occludes the subpixel mask of the graph image pixel data, discarding the graphic image pixel data, if the subpixel mask of the frame buffer pixel data does not occlude the subpixel mask of the graphic image pixel data, pushing the graphic image pixel data, when all graphic image pixel data has been compared to corresponding frame buffer pixel data or when the pixel buffer is full, reading the pixel buffer data from the pixel buffer and comparing the pixel buffer data to the corresponding frame buffer pixel data wherein if the subpixel mask of pixel buffer data is not occluded by the subpixel mask of the frame buffer pixel data, or if the subpixel mask of the frame buffer pixel data is not occluded by the subpixel mask of the pixel buffer data, blending according to a third blending function the frame buffer pixel data and pixel buffer data;

reading the modified pixel data stored in the frame buffer and enabling the corresponding pixels on the display at the color specified by the modified pixel data to generate the graphic image on the display;

whereby only those graphic image pixel data which remain in the pixel buffer are combined with the frame buffer pixel data using time consuming compositing equations and the time consuming task of compositing of those graphic image pixels which are behind and occluded by frame buffer pixels is avoided.

* * * * *

UNITED STATES PATENT AND TRADEMARK OFFICE
CERTIFICATE OF CORRECTION

PATENT NO. : 5,175,805
DATED : December 29, 1992
INVENTOR(S) : Carrie

It is certified that error appears in the above-identified patent and that said Letters Patent is hereby corrected as shown below:

In column 13, claim 8 at line 62, please delete " $fb_{-rgb+new-}rgb$ " and insert -- fb_rgb+new_rgb --".

In column 17 claim 16 at line 9, please delete " dn " and insert -- and --.

Signed and Sealed this

Sixteenth Day of September, 1997

Attest:

BRUCE LEHMAN

Attesting Officer

Commissioner of Patents and Trademarks